A. H. LEIPERT.
METHOD OF MANUFACTURING GEARING.
APPLICATION FILED DEC. 14, 1920.
1,412,185. Patented Apr. 11, 1922.
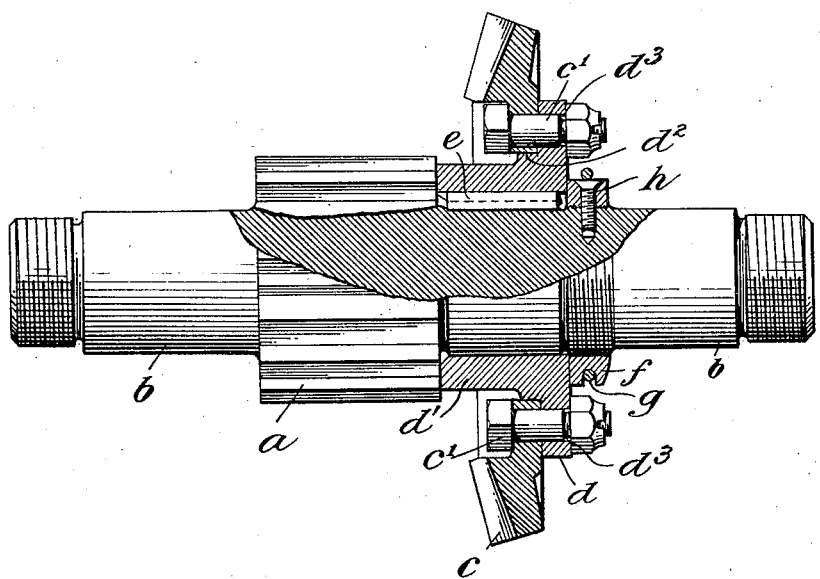
Inventor
August H. Leipert
By his Attorneys
Redding & Greeley

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

METHOD OF MANUFACTURING GEARING.

1,412,185.         Specification of Letters Patent.    Patented Apr. 11, 1922.

Original application filed December 30, 1919, Serial No. 348,448. Divided and this application filed December 14, 1920. Serial No. 430,706.

*To all whom it may concern:*

Be it known that I, AUGUST H. LEIPERT, a citizen of the United States, residing in the borough of Queens of the city of New York, in the State of New York, have invented certain new and useful Improvements in Methods of Manufacturing Gearing, of which the following is a specification, reference being had to the accompanying drawing, forming a part hereof.

This case is a division of applicant's copending application Ser. No. 348,448, filed December 30th, 1919. The invention is concerned with an improved method of manufacturing gearing in which, where more than one gear or other part is carried on a shaft, there is a gear integral with the shaft. More particularly, the immediate problem has arisen in double reduction gearing in which two gears are carried on a shaft in close juxtaposition to each other, these gears being of different diameters to afford the desired reduction.

In manufacturing such a construction in which one gear or pinion is integral with the shaft it becomes exceedingly difficult, if not impossible, to carry on satisfactorily the operations of cutting and grinding this integral gear by reason of the interference with the necessary tools of the other gear or part which is carried on the shaft in close juxtaposition to the first named gear. In accordance with the improved method of manufacture, it is proposed to cut, harden and grind the gear which is integral with the shaft and then fix the other gear or part on the shaft in a novel manner. In the illustrated embodiment, for instance, there is shown a pinion integral with the shaft and a bevel gear carried on the shaft in close juxtaposition to the pinion, the improved method of manufacture contemplating the cutting, hardening and grinding of the pinion before the bevel gear and its hub are fixed to the shaft. A further object of the invention is concerned with the method of applying the second gear or other member to the shaft by making the gear as a ring separable from its hub, shrinking the hub on the shaft and then securing the ring gear to the hub. The improvement will appear in greater detail hereinafter in connection with the description given with reference to the illustrated embodiment in the drawing in which the single view shows partly in section and partly in elevation a shaft and double reduction gearing constructed and assembled in accordance with the invention.

As stated hereinbefore, while this specification will describe the improved method of manufacturing with reference to a product in which there are provided double reduction gears on a single shaft, one of which gears is integral therewith, it is to be understood that some other element than the detached gear may be mounted on the shaft to advantage in accordance with the improved method.

As shown in the drawing, a spur pinion $a$ is formed integral with the pinion shaft $b$, on which is carried a bevel gear $c$, secured by bolts $c'$ to a flange $d$ of its hub $d'$. The elements thus far described in their intended relationship will have the hub $d'$ of the bevel gear $c$ in close juxtaposition to and, usually, in abutment with the spur pinion $a$. With the parts in this relation it is obvious that in manufacture the necessary clearance for the operation of the tools employed in the cutting and grinding of the spur pinion $a$ is not afforded. Accordingly, it is proposed by the improved method to meet this difficulty by cutting, hardening and grinding the spur pinion $a$ on the shaft $b$ before the other gear $c$ with its hub $d'$ is applied to the shaft. With the hub $d'$ and the bevel gear $c$ removed from the shaft it is evident that the cutting and grinding operations on the pinion $a$ may be effectively performed. After the spur pinion $a$ is cut, hardened and ground, there is presented the problem of affixing the gear $c$ to the shaft $b$ in such manner as to insure such rigidity and durability as will be tantamount to integrality. In attaining this end, it is proposed to heat the hub $d'$ and shrink it on to the shaft $b$, a key $e$ being preferably employed as a supplemental holding element. The inner face of the hub $d'$ may abut against the proximate face of the pinion $a$. As a final safeguard in fixing the hub $d'$ securely on the shaft $b$ a lock nut $f$ may be threaded on to the shaft $b$ against the hub $d'$ and finally locked in place by means of a lock wire $g$ encircling the nut and sprung over a grooved stud $h$ which passes through the nut into the shaft. With the hub $d'$ thus securely affixed to the shaft $b$ there may be attached thereto the ring gear $c$ or other part. The simplest means for facilitating the attachment of the gear $c$ to the hub $d'$ is illustrated, wherein the hub $d'$ is provided with a cylindrical flange $d$ shouldered, as at $d^2$, to afford a substantial bearing surface for the inner periphery of the ring gear $c$. The flange $d$ may have suitable bolt holes $d^3$ drilled and reamed therein after the hub $d'$ is affixed to the shaft $b$ and through these bolt holes will pass the locking bolts $c'$ whereby the gear $c$ is held to the flange. It will be observed that the inner diameter of the ring gear $c$ is such as to permit it to be passed over the spur pinion $a$ in assembling and disassembling.

The method herein while described in connection with double reduction gearing may find other useful applications under somewhat corresponding conditions wherein the preliminary cutting and grinding of one gear on a shaft is practically necessary before the application to that shaft of a second gear or other part.

The method is defined in the accompanying claims in language which will indicate the scope of the invention.

I claim as my invention.

1. The herein described method which consists in cutting, hardening and grinding a gear integral with a shaft, shrinking a hub on the shaft in juxtaposition to the gear and then securing a member to the hub.

2. The herein described method which consists in cutting, hardening and grinding a pinion integral with a shaft, shrinking and keying a flanged hub on the shaft with one face in abutment with the proximate face of the pinion, locking the hub in place by a lock nut, drilling and reaming bolt holds in the flange of the hub and bolting a ring gear to the flange.

This specification signed this tenth day of December, A. D. 1920.

AUGUST H. LEIPERT.